(12) United States Patent
Nguyen et al.

(10) Patent No.: US 7,261,156 B2
(45) Date of Patent: *Aug. 28, 2007

(54) METHODS USING PARTICULATES COATED WITH TREATMENT CHEMICAL PARTITIONING AGENTS

(75) Inventors: Philip D. Nguyen, Duncan, OK (US); Thomas D. Welton, Duncan, OK (US); Billy F. Slabaugh, Duncan, OK (US); Matthew E. Blauch, Duncan, OK (US); Mark A. Parker, Marlow, OK (US); Jimmie D. Weaver, Duncan, OK (US); Bobby K. Bowles, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 270 days.

This patent is subject to a terminal disclaimer.

(21) Appl. No.: 11/072,355

(22) Filed: Mar. 4, 2005

(65) Prior Publication Data

US 2005/0194135 A1 Sep. 8, 2005

Related U.S. Application Data

(63) Continuation-in-part of application No. 10/794,076, filed on Mar. 5, 2004, now Pat. No. 7,063,151.

(51) Int. Cl.
*E21B 43/04* (2006.01)
*E21B 43/267* (2006.01)

(52) U.S. Cl. .......... 166/276; 166/280.2; 166/281; 166/295; 166/300; 428/407; 507/924

(58) Field of Classification Search .......... 166/276, 166/278, 280.2, 281, 295, 300; 427/212; 428/407; 507/924; 523/130
See application file for complete search history.

(56) References Cited

U.S. PATENT DOCUMENTS

| | | | |
|---|---|---|---|
| 2,238,671 A | 4/1941 | Woodhouse | 166/21 |
| 4,493,875 A | 1/1955 | Beck et al. | 428/403 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,336,980 A | 8/1967 | Rike | 166/295 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |

(Continued)

FOREIGN PATENT DOCUMENTS

CA 2063877 5/2003

(Continued)

OTHER PUBLICATIONS

U.S. Appl. No. 10/383,154, filed Mar. 6, 2003, Nguyen et al.

(Continued)

*Primary Examiner*—George Suchfield
(74) *Attorney, Agent, or Firm*—Robert A. Kent; Baker Botts

(57) ABSTRACT

Methods of treating a portion of a subterranean formation comprising: providing partitioned, coated particulates that comprise particulates, an adhesive substance, and a partitioning agent, and wherein the partitioning agent comprises a subterranean treatment chemical; substantially slurrying the partitioned, coated particulates in a treatment fluid to create a particulate slurry; and, placing the particulate slurry into the portion of the subterranean formation.

22 Claims, No Drawings

U.S. PATENT DOCUMENTS

| | | | | |
|---|---|---|---|---|
| 4,245,702 A | 1/1981 | Haafkens et al. | ............. | 166/307 |
| 4,273,187 A | 6/1981 | Satter et al. | ................ | 166/250 |
| 4,291,766 A | 9/1981 | Davies et al. | ............... | 166/276 |
| 4,305,463 A | 12/1981 | Zakiewicz | .................. | 106/245 |
| 4,336,842 A | 6/1982 | Graham et al. | ............. | 166/276 |
| 4,352,674 A | 10/1982 | Fery | ......................... | 23/230 |
| 4,353,806 A | 10/1982 | Canter et al. | ............... | 507/229 |
| 4,387,769 A | 6/1983 | Erbstoesser et al. | ........ | 166/295 |
| 4,415,805 A | 11/1983 | Fertl et al. | .................. | 250/260 |
| 4,439,489 A | 3/1984 | Johnson et al. | ............. | 428/404 |
| 4,443,347 A | 4/1984 | Underdown et al. | ... | 252/8.55 R |
| 4,460,052 A | 7/1984 | Gockel | ........................ | 175/72 |
| 4,470,915 A | 9/1984 | Conway | ................ | 252/8.55 R |
| 4,494,605 A | 1/1985 | Wiechel et al. | ............ | 166/288 |
| 4,498,995 A | 2/1985 | Gockel | .................. | 252/8.5 LC |
| 4,501,328 A | 2/1985 | Nichols | ...................... | 166/288 |
| 4,526,695 A | 7/1985 | Erbstosser et al. | ...... | 252/8.55 R |
| 4,527,627 A | 7/1985 | Graham et al. | ............. | 166/280 |
| 4,541,489 A | 9/1985 | Wu | ............................. | 166/312 |
| 4,546,012 A | 10/1985 | Brooks | ...................... | 427/213 |
| 4,553,596 A | 11/1985 | Graham et al. | ............. | 166/295 |
| 4,564,459 A | 1/1986 | Underdown et al. | ... | 252/8.55 R |
| 4,572,803 A | 2/1986 | Yamazoe et al. | ............. | 534/16 |
| 4,649,998 A | 3/1987 | Friedman | ................... | 166/294 |
| 4,664,819 A | 5/1987 | Glaze et al. | ............. | 252/8.551 |
| 4,665,988 A | 5/1987 | Murphey et al. | ........... | 166/295 |
| 4,669,543 A | 6/1987 | Young | ........................ | 166/276 |
| 4,675,140 A | 6/1987 | Sparks et al. | ................ | 264/4.3 |
| 4,683,954 A | 8/1987 | Walker et al. | .............. | 166/307 |
| 4,694,905 A | 9/1987 | Armbruster | ................. | 166/280 |
| 4,715,967 A | 12/1987 | Bellis | ...................... | 252/8.551 |
| 4,716,964 A | 1/1988 | Erbstoesser et al. | ........ | 166/284 |
| 4,733,729 A | 3/1988 | Copeland | .................... | 166/276 |
| 4,739,832 A | 4/1988 | Jennings, Jr. et al. | ....... | 166/299 |
| 4,785,884 A | 11/1988 | Armbruster | ................. | 166/280 |
| 4,787,453 A | 11/1988 | Hewgill et al. | .......... | 166/272.3 |
| 4,789,105 A | 12/1988 | Hosokawa et al. | ........... | 241/67 |
| 4,796,701 A | 1/1989 | Hudson et al. | ............. | 166/278 |
| 4,797,262 A | 1/1989 | Dewitz | ....................... | 422/142 |
| 4,800,960 A | 1/1989 | Friedman et al. | ........... | 166/276 |
| 4,809,783 A | 3/1989 | Hollenbeck et al. | ........ | 166/307 |
| 4,817,721 A | 4/1989 | Pober | ......................... | 166/295 |
| 4,829,100 A | 5/1989 | Murphey et al. | ........... | 523/131 |
| 4,838,352 A | 6/1989 | Oberste-Padtberg et al. | ............ | 166/291 |
| 4,842,072 A | 6/1989 | Friedman et al. | ........... | 166/295 |
| 4,843,118 A | 6/1989 | Lai et al. | .................... | 524/555 |
| 4,848,467 A | 7/1989 | Cantu et al. | ................ | 166/281 |
| 4,848,470 A | 7/1989 | Korpics | ...................... | 166/312 |
| 4,850,430 A | 7/1989 | Copeland et al. | ........... | 166/276 |
| 4,886,354 A | 12/1989 | Welch et al. | ................. | 356/70 |
| 4,888,240 A | 12/1989 | Graham et al. | ............. | 428/403 |
| 4,895,207 A | 1/1990 | Friedman et al. | ........... | 166/276 |
| 4,903,770 A | 2/1990 | Friedman et al. | ........... | 166/288 |
| 4,934,456 A | 6/1990 | Moradi-Araghi | ............ | 166/270 |
| 4,936,385 A | 6/1990 | Weaver et al. | ............. | 166/288 |
| 4,942,186 A | 7/1990 | Murphey et al. | ........... | 523/131 |
| 4,957,165 A | 9/1990 | Cantu et al. | ................ | 166/295 |
| 4,959,432 A | 9/1990 | Fan et al. | .................... | 526/287 |
| 4,961,466 A | 10/1990 | Himes et al. | ................ | 166/250 |
| 4,969,522 A | 11/1990 | Whitehurst et al. | ......... | 166/278 |
| 4,969,523 A | 11/1990 | Martin et al. | ............... | 166/276 |
| 4,986,353 A | 1/1991 | Clark et al. | ................ | 166/279 |
| 4,986,354 A | 1/1991 | Cantu et al. | ................ | 166/279 |
| 4,986,355 A | 1/1991 | Casad et al. | ................ | 166/295 |
| 5,030,603 A | 7/1991 | Rumpf et al. | ................ | 501/127 |
| 5,049,743 A | 9/1991 | Taylor, III et al. | .......... | 250/303 |
| 5,082,056 A | 1/1992 | Tackett, Jr. | ................. | 166/295 |
| 5,105,886 A | 4/1992 | Strubhar et al. | ............ | 166/280 |
| 5,107,928 A | 4/1992 | Hilterhaus | .................. | 166/293 |
| 5,128,390 A | 7/1992 | Murphey et al. | ........... | 523/130 |
| 5,135,051 A | 8/1992 | Fracteau et al. | ............. | 166/104 |
| 5,142,023 A | 8/1992 | Gruber et al. | .............. | 528/354 |
| 5,165,438 A | 11/1992 | Fracteau et al. | ................ | 137/1 |
| 5,173,527 A | 12/1992 | Calve | .......................... | 524/74 |
| 5,178,218 A | 1/1993 | Dees | ......................... | 166/281 |
| 5,182,051 A | 1/1993 | Bandy et al. | ................ | 252/645 |
| 5,199,491 A | 4/1993 | Kutts et al. | ................. | 166/276 |
| 5,199,492 A | 4/1993 | Surles et al. | ............... | 166/295 |
| 5,211,234 A | 5/1993 | Floyd | ......................... | 166/276 |
| 5,216,050 A | 6/1993 | Sinclair | ...................... | 524/108 |
| 5,218,038 A | 6/1993 | Johnson et al. | ............. | 524/541 |
| 5,232,955 A | 8/1993 | Caabai et al. | ................. | 521/63 |
| 5,232,961 A | 8/1993 | Murphey et al. | ........... | 523/414 |
| 5,238,068 A | 8/1993 | Fredrickson | ................ | 166/307 |
| 5,247,059 A | 9/1993 | Gruber et al. | ............. | 528/354 |
| 5,249,628 A | 10/1993 | Surjaatmadja | ............. | 166/305 |
| 5,256,729 A | 10/1993 | Kutts et al. | ................. | 524/700 |
| 5,273,115 A | 12/1993 | Spafford | ...................... | 166/281 |
| 5,285,849 A | 2/1994 | Surles et al. | ............... | 166/295 |
| 5,293,939 A | 3/1994 | Surles et al. | ............... | 166/295 |
| 5,295,542 A | 3/1994 | Cole et al. | .................. | 166/278 |
| 5,320,171 A | 6/1994 | Laramay | ..................... | 166/285 |
| 5,321,062 A | 6/1994 | Landrum et al. | ............ | 523/141 |
| 5,325,923 A | 7/1994 | Surjaatmadja et al. | ...... | 166/308 |
| 5,330,005 A | 7/1994 | Card et al. | ................. | 166/280 |
| 5,332,037 A | 7/1994 | Schmidt et al. | ............. | 166/276 |
| 5,335,726 A | 8/1994 | Rodrogues | ................... | 166/295 |
| 5,351,754 A | 10/1994 | Hardin et al. | ................ | 166/249 |
| 5,358,051 A | 10/1994 | Rodrigues | .................... | 166/295 |
| 5,359,026 A | 10/1994 | Gruber | ......................... | 528/354 |
| 5,360,068 A | 11/1994 | Sprunt et al. | ................ | 166/259 |
| 5,361,856 A | 11/1994 | Surjaatmajda et al. | ........ | 175/67 |
| 5,363,916 A | 11/1994 | Himes et al. | ............... | 166/276 |
| 5,373,901 A | 12/1994 | Norman et al. | ............. | 166/300 |
| 5,377,759 A | 1/1995 | Surles | ........................ | 166/295 |
| 5,381,864 A | 1/1995 | Nguyen et al. | ............. | 166/280 |
| 5,386,874 A | 2/1995 | Laramay et al. | ............ | 166/300 |
| 5,388,648 A | 2/1995 | Jordan, Jr. | .................. | 166/380 |
| 5,393,810 A | 2/1995 | Harris et al. | .................. | 524/56 |
| 5,396,957 A | 3/1995 | Surjaatmadja et al. | ...... | 166/308 |
| 5,402,846 A | 4/1995 | Jennings, Jr. et al. | ....... | 166/259 |
| 5,422,183 A | 6/1995 | Sinclair et al. | ............. | 428/403 |
| 5,423,381 A | 6/1995 | Surles et al. | ............... | 166/295 |
| 5,439,055 A | 8/1995 | Card et al. | ................. | 166/280 |
| 5,460,226 A | 10/1995 | Lawton et al. | ............. | 166/300 |
| 5,464,060 A | 11/1995 | Hale et al. | .................. | 166/293 |
| 5,475,080 A | 12/1995 | Gruber et al. | .............. | 528/354 |
| 5,484,881 A | 1/1996 | Gruber et al. | ................ | 528/54 |
| 5,494,103 A | 2/1996 | Surjaatmadja et al. | ...... | 166/222 |
| 5,494,178 A | 2/1996 | Nguyen et al. | ............. | 166/276 |
| 5,497,830 A | 3/1996 | Boles et al. | ................ | 166/300 |
| 5,498,280 A | 3/1996 | Fistner et al. | .................. | 106/19 |
| 5,499,678 A | 3/1996 | Surjaatmadja et al. | ...... | 166/298 |
| 5,501,275 A | 3/1996 | Card et al. | ................. | 166/280 |
| 5,505,787 A | 4/1996 | Yamaguchi | ..................... | 134/4 |
| 5,512,071 A | 4/1996 | Yam et al. | ..................... | 51/307 |
| 5,520,250 A | 5/1996 | Harry et al. | ................ | 166/278 |
| 5,522,460 A | 6/1996 | Shu | ............................. | 166/295 |
| 5,529,123 A | 6/1996 | Carpenter et al. | ........... | 166/293 |
| 5,531,274 A | 7/1996 | Bienvenu, Jr. | ............... | 166/280 |
| 5,536,807 A | 7/1996 | Gruber et al. | .............. | 528/354 |
| 5,545,824 A | 8/1996 | Stengel et al. | .............. | 524/590 |
| 5,547,023 A | 8/1996 | McDaniel et al. | .......... | 166/280 |
| 5,551,513 A | 9/1996 | Suries et al. | ............... | 166/278 |
| 5,551,514 A | 9/1996 | Nelson et al. | ............... | 166/280 |
| 5,582,249 A | 12/1996 | Caveny et al. | ............. | 166/276 |
| 5,582,250 A | 12/1996 | Constein | ..................... | 166/280 |
| 5,588,488 A | 12/1996 | Vijn et al. | ................... | 166/293 |
| 5,591,700 A | 1/1997 | Harris et al. | ............... | 507/204 |
| 5,594,095 A | 1/1997 | Gruber et al. | .............. | 528/354 |
| 5,595,245 A | 1/1997 | Scott, III | ................. | 166/250.1 |
| 5,597,784 A | 1/1997 | Sinclair et al. | ........... | 507/212.9 |
| 5,604,184 A | 2/1997 | Ellis et al. | ................... | 507/117 |

| Patent | Date | Inventor | Class |
|---|---|---|---|
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/280 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,969,823 A | 10/1999 | Wurz et al. | 166/278 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacob et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B2 | 12/2001 | Chatterji et al. | 166/295 |
| 6,350,309 B2 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |
| 6,372,678 B1 | 4/2002 | Youngsman et al. | 504/128 |
| 6,376,571 B1 | 4/2002 | Chawla et al. | 522/64 |
| 6,387,986 B1 | 5/2002 | Moradi-Araghi et al. | 523/211 |
| 6,390,195 B1 | 5/2002 | Nguyen et al. | 166/276 |
| 6,401,817 B1 | 6/2002 | Griffith et al. | 166/295 |
| 6,405,797 B2 | 6/2002 | Davidson et al. | 166/249 |
| 6,406,789 B1 | 6/2002 | McDaniel et al. | 428/403 |
| 6,408,943 B1 | 6/2002 | Schultz et al. | 166/285 |
| 6,422,314 B1 | 7/2002 | Todd et al. | 166/312 |
| 6,439,309 B1 | 8/2002 | Matherly et al. | 166/276 |
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |

| | | | |
|---|---|---|---|
| 6,448,206 B1 | 9/2002 | Griffith et al. .............. 507/219 |
| 6,450,260 B1 | 9/2002 | James et al. ................ 166/277 |
| 6,454,003 B1 | 9/2002 | Chang et al. ................ 166/270 |
| 6,458,885 B1 | 10/2002 | Stengel et al. .............. 524/507 |
| 6,485,947 B1 | 11/2002 | Rajgarhia et al. ........... 435/139 |
| 6,488,091 B1 | 12/2002 | Weaver et al. .............. 166/300 |
| 6,488,763 B2 | 12/2002 | Brothers et al. ............ 106/692 |
| 6,494,263 B2 | 12/2002 | Todd ........................ 166/312 |
| 6,503,870 B2 | 1/2003 | Griffith et al. .............. 507/219 |
| 6,508,305 B1 | 1/2003 | Brannon et al. ............ 166/293 |
| 6,527,051 B1 | 3/2003 | Reddy et al. ............... 166/300 |
| 6,528,157 B1 | 3/2003 | Hussain et al. ............. 428/325 |
| 6,531,427 B1 | 3/2003 | Shuchart et al. ........... 507/267 |
| 6,538,576 B1 | 3/2003 | Schultz et al. ........... 340/859.6 |
| 6,543,545 B1 | 4/2003 | Chatterji et al. ............ 166/381 |
| 6,552,333 B1 | 4/2003 | Storm et al. ............. 250/269.3 |
| 6,554,071 B1 | 4/2003 | Reddy et al. ............... 166/293 |
| 6,555,507 B2 | 4/2003 | Chatterji et al. ............ 507/219 |
| 6,569,814 B1 | 5/2003 | Brady et al. ................ 507/201 |
| 6,582,819 B2 | 6/2003 | McDaniel et al. .......... 428/402 |
| 6,593,402 B2 | 7/2003 | Chatterji et al. ............... 524/7 |
| 6,599,863 B1 | 7/2003 | Palmer et al. ............... 507/219 |
| 6,608,162 B1 | 8/2003 | Chiu et al. .................. 528/129 |
| 6,616,320 B2 | 9/2003 | Huber et al. ............. 366/156.2 |
| 6,620,857 B2 | 9/2003 | Valet .......................... 522/42 |
| 6,626,241 B2 | 9/2003 | Nguyen ...................... 166/278 |
| 6,632,527 B1 | 10/2003 | McDaniel et al. .......... 428/402 |
| 6,632,892 B2 | 10/2003 | Rubinsztajn et al. ....... 525/476 |
| 6,642,309 B2 | 11/2003 | Komitsu et al. ............. 525/100 |
| 6,648,501 B2 | 11/2003 | Huber et al. ................ 366/301 |
| 6,659,179 B2 | 12/2003 | Nguyen ...................... 166/227 |
| 6,664,343 B2 | 12/2003 | Narisawa et al. ........... 525/474 |
| 6,667,279 B1 | 12/2003 | Hessert et al. .............. 507/225 |
| 6,668,926 B2 | 12/2003 | Nguyen et al. ............. 166/280 |
| 6,669,771 B2 | 12/2003 | Tokiwa et al. ............ 106/162.7 |
| 6,681,856 B1 | 1/2004 | Chatterji et al. ............. 166/294 |
| 6,686,328 B1 | 2/2004 | Binder ....................... 510/446 |
| 6,705,400 B1 | 3/2004 | Nguyen et al. ............. 166/281 |
| 6,710,019 B1 | 3/2004 | Sawdon et al. ............. 507/136 |
| 6,713,170 B1 | 3/2004 | Kaneka et al. .............. 428/323 |
| 6,725,926 B2 | 4/2004 | Nguyen et al. .......... 166/254.1 |
| 6,725,931 B2 | 4/2004 | Nguyen et al. ........... 166/280.2 |
| 6,729,404 B2 | 5/2004 | Nguyen et al. ........... 166/280.2 |
| 6,732,800 B2 | 5/2004 | Acock et al. ............... 166/308 |
| 6,745,159 B1 | 6/2004 | Todd et al. .................... 703/10 |
| 6,749,025 B1 | 6/2004 | Brannon et al. ......... 166/305.1 |
| 6,763,888 B1 | 7/2004 | Harris et al. ............. 166/305.1 |
| 6,766,858 B2 | 7/2004 | Nguyen et al. ............. 166/300 |
| 6,776,236 B1 | 8/2004 | Nguyen ...................... 166/279 |
| 6,832,650 B2 | 12/2004 | Nguyen et al. ............. 166/279 |
| 6,851,474 B2 | 2/2005 | Nguyen ...................... 166/279 |
| 6,887,834 B2 | 5/2005 | Nguyen et al. ............. 507/221 |
| 6,978,836 B2 | 12/2005 | Nguyen et al. ............. 166/295 |
| 7,063,151 B2 * | 6/2006 | Nguyen et al. .......... 166/280.2 |
| 2001/0016562 A1 | 8/2001 | Muir et al. .................. 507/201 |
| 2002/0043370 A1 | 4/2002 | Poe ........................ 166/250.07 |
| 2002/0048676 A1 | 4/2002 | McDaniel et al. .......... 428/404 |
| 2002/0070020 A1 | 6/2002 | Nguyen ...................... 166/279 |
| 2003/0006036 A1 | 1/2003 | Malone et al. ......... 166/250.12 |
| 2003/0060374 A1 | 3/2003 | Cooke, Jr. ................... 507/200 |
| 2003/0114314 A1 | 6/2003 | Ballard et al. .............. 507/100 |
| 2003/0130133 A1 | 7/2003 | Vollmer ...................... 507/100 |
| 2003/0131999 A1 | 7/2003 | Nguyen et al. ............. 166/280 |
| 2003/0148893 A1 | 8/2003 | Lungofer et al. ........... 507/200 |
| 2003/0186820 A1 | 10/2003 | Thesing ...................... 507/200 |
| 2003/0188766 A1 | 10/2003 | Banerjee et al. ................ 134/7 |
| 2003/0188872 A1 | 10/2003 | Nguyen et al. ............. 166/308 |
| 2003/0196805 A1 | 10/2003 | Boney et al. ................ 166/280 |
| 2003/0205376 A1 | 11/2003 | Ayoub et al. ............. 166/254.2 |
| 2003/0230408 A1 | 12/2003 | Acock et al. ............... 166/297 |
| 2003/0234103 A1 | 12/2003 | Lee et al. .................... 166/293 |
| 2004/0000402 A1 | 1/2004 | Nguyen et al. ............. 166/280 |
| 2004/0014607 A1 | 1/2004 | Sinclair et al. .............. 507/200 |
| 2004/0014608 A1 | 1/2004 | Nguyen et al. ............. 507/200 |
| 2004/0040706 A1 | 3/2004 | Hossaini et al. ............ 166/278 |
| 2004/0040708 A1 | 3/2004 | Stephenson et al. ..... 166/280.1 |
| 2004/0040713 A1 | 3/2004 | Nguyen et al. ............. 166/295 |
| 2004/0048752 A1 | 3/2004 | Nguyen et al. ............. 507/269 |
| 2004/0055747 A1 | 3/2004 | Lee ........................... 166/278 |
| 2004/0106525 A1 | 6/2004 | Willbert et al. ............. 507/200 |
| 2004/0138068 A1 | 7/2004 | Rimmer et al. ............. 507/100 |
| 2004/0149441 A1 | 8/2004 | Nguyen et al. .......... 166/280.1 |
| 2004/0152601 A1 | 8/2004 | Still et al. ................... 507/100 |
| 2004/0177961 A1 | 9/2004 | Nguyen et al. ........... 166/280.2 |
| 2004/0194961 A1 | 10/2004 | Nguyen et al. ............. 166/295 |
| 2004/0206499 A1 | 10/2004 | Nguyen et al. .......... 166/280.2 |
| 2004/0211559 A1 | 10/2004 | Nguyen et al. ............. 166/276 |
| 2004/0211561 A1 | 10/2004 | Nguyen et al. .......... 166/280.2 |
| 2004/0221992 A1 | 11/2004 | Nguyen et al. ............. 166/295 |
| 2004/0231845 A1 | 11/2004 | Cooke, Jr. ................... 166/279 |
| 2004/0231847 A1 | 11/2004 | Nguyen et al. ............. 166/295 |
| 2004/0256099 A1 | 12/2004 | Nguyen et al. ............. 166/249 |
| 2004/0261995 A1 | 12/2004 | Nguyen et al. ............. 166/279 |
| 2004/0261997 A1 | 12/2004 | Nguyen et al. ............. 166/281 |
| 2005/0000731 A1 | 1/2005 | Nguyen et al. ................ 175/57 |
| 2005/0006093 A1 | 1/2005 | Nguyen et al. ............. 166/281 |
| 2005/0006095 A1 | 1/2005 | Justus et al. ................ 166/295 |
| 2005/0006096 A1 | 1/2005 | Nguyen et al. ............. 166/295 |
| 2005/0034862 A1 | 2/2005 | Nguyen et al. ............. 166/281 |
| 2005/0045326 A1 | 3/2005 | Nguyen ...................... 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1107584 | 3/1968 |
| GB | 1264180 | 12/1969 |
| GB | 1292718 | 10/1972 |
| GB | 2382143 A | 4/2001 |
| WO | WO93/15127 | 8/1993 |
| WO | WO94/07949 | 4/1994 |
| WO | WO94/08078 | 4/1994 |
| WO | WO94/08090 | 4/1994 |
| WO | WO95/09879 | 4/1995 |
| WO | WO97/11845 | 4/1997 |
| WO | WO99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 05/021928 A2 | 3/2005 |

OTHER PUBLICATIONS

U.S. Appl. No. 10/408,800, filed Apr. 7, 2003, Nguyen et al.
U.S. Appl. No. 10/649,029, filed Aug. 27, 2003, Nguyen et al.
U.S. Appl. No. 10/650,063, filed Aug. 26, 2003, Nguyen et al.
U.S. Appl. No. 10/650,064, filed Aug. 26, 2003, Nguyen et al.
U.S. Appl. No. 10/650,065, filed Aug. 26, 2003, Nguyen et al.

U.S. Appl. No. 10/659,574, filed Sep. 10, 2003, Nguyen et al.
U.S. Appl. No. 10/751,593, filed Jan. 5, 2004, Nguyen et al.
U.S. Appl. No. 10/775,347, filed Feb. 10, 2004, Nguyen et al.
U.S. Appl. No. 10/791,944, filed Mar. 3, 2004, Nguyen et al.
U.S. Appl. No. 10/793,711, filed Mar. 5, 2004, Nguyen et al.
U.S. Appl. No. 10/852,811, filed May 25, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen et al.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen et al.
U.S. Appl. No. 11/049,252, filed Feb. 2, 2005, Van Batenburg et al.
U.S. Appl. No. 11/053,280, filed Feb. 8, 2005, Nguyen et al.
Halliburton, *CoalStim$^{SM}$ Service, Helps Boost Clash Flow From CBM Assets*, Stimulation, HO3679 Oct. 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton, *SandWedge® NT Conductivity Enhancement System, Enahances Proppant Pack Conductivity and Helps Prevent Intrusion of Formation Material for Improved Long-Term Production*, Stimulation, HO2289 May 2004, Halliburton Communications.
U.S. Appl. No. 10/394,898, filed Mar. 21, 2003, Eoff et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/727,365, filed Dec. 4 2003, Reddy et al.
U.S. Appl. No. 10/853,879, filed May 26, 2004, Nguyen et al.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Almond et al., *Factors Proppant Flowback With Resin Coated Proppants*, SPE 30096, pp. 171-186, May 1995.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al, 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 2005, 1971.

Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al., "*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradatin of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Halliburton brochure entitled "H2Zero™ Service Introducing The Next Generation of cost-Effective Conformance Control Solutions", 2002.
Halliburton brochure entitled INJECTROL® A Component, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11, 2005.
Yoary Attia, et al.., "*Adsorption Thermodynamics of a Hydrophobic Polymeric Flocculant on Hydrophobic Colloidal Coal Particulates*," American Chemical Society, p. 2203-2207, 1991.

* cited by examiner

METHODS USING PARTICULATES COATED WITH TREATMENT CHEMICAL PARTITIONING AGENTS

RELATED APPLICATIONS

The present invention is a continuation in part of U.S. patent application Ser. No. 10/794,076 filed on Mar. 5, 2004 now U.S. Pat. No. 7,063,151. Moreover, the present invention is related to U.S. application Ser. No. 11/072,669 entitled "Methods of Using Partitioned, Coated Particulates" filed on the same date herewith, which is assigned to the assignee of the present invention, the entire disclosure of which is incorporated herein by reference.

BACKGROUND

The present invention involves methods of preparing coated particulates and using such coated particulates in subterranean applications such as production enhancement and sand control. More particularly, the present invention relates to methods of preparing particulates treated with an adhesive substance (such as a tackifying agent or curable resin) such that the particulates are able to resist sticking and clumping and need not be immediately used once they are prepared.

Subterranean operations often use particulates coated with an adhesive substance such as a tackifying agent or a curable resin. One example of a production stimulation operation using such coated particulates is hydraulic fracturing, wherein a formation is treated to increase its permeability by hydraulically fracturing the formation to create or enhance one or more cracks or "fractures." In most cases, a hydraulic fracturing treatment involves pumping a proppant-free, viscous fluid (known as a pad fluid) into a subterranean formation faster than the fluid can escape into the formation so that the pressure in the formation rises and the formation breaks, creating an artificial fracture or enlarging a natural fracture. Then particulates known in the art as proppant are placed into the fracture to prevent the fracture form closing when the pumping pressure is released. A portion of the proppant may be coated with an adhesive substance to control the migration of the proppant particulates and/or to control the migration of formation sands and fines.

An example of a well completion operation using a treating fluid containing coated particulates is gravel packing. Gravel packing treatments are used, inter alia, to reduce the migration of unconsolidated formation particulates into the well bore. In gravel packing operations, particulates known in the art as gravel are carried to a well bore by a hydrocarbon or water treatment fluid. That is, the particulates are suspended in a treatment fluid, which may be viscosified, and the treatment fluid is pumped into a well bore in Which the gravel pack is to be placed. The treatment fluid leaks off into the subterranean zone and/or is returned to the surface while the particulates are left in the zone. The resultant gravel pack acts as a filter to separate formation sands from produced fluids while permitting the produced fluids to flow into the well bore. A portion of the gravel may be coated with resin or tackifying agent, inter alia, to further help control the migration of formation fines. Typically, gravel pack operations involve placing a gravel pack screen in the well bore and packing the surrounding annulus between the sand control screen and the formation (or casing) with gravel designed to prevent the passage of formation sands through the pack. The sand control screen is generally a type of filter assembly used to support and retain the gravel placed during the gravel pack operation. A wide range of sizes and screen configurations are available to suit the characteristics of a particular well bore, the production fluid, and the subterranean formation sands. Such gravel packs may be used to stabilize a portion of a formation while causing minimal impairment to well productivity. The gravel is generally designed to prevent formation sands from occluding the screen or migrating with the produced fluids, and the screen is generally designed prevent the gravel from entering the well bore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

SUMMARY OF THE INVENTION

The present invention involves methods of preparing coated particulates and using such coated particulates in subterranean applications such as production enhancement and sand control. More particularly, the present invention relates to methods of preparing particulates treated with an adhesive substance (such as a tackifying agent or curable resin) such that the particulates are able to resist sticking and clumping and need not be immediately used once they are prepared.

One embodiment of the present invention provides methods of treating a portion of a subterranean formation comprising: providing partitioned, coated particulates that comprise particulates, an adhesive substance, and a partitioning agent, and wherein the partitioning agent comprises a subterranean treatment chemical; substantially slurrying the partitioned, coated particulates in a treatment fluid to create a particulate slurry; and, placing the particulate slurry into the portion of the subterranean formation.

Another embodiments of the present invention provides methods of creating a propped fracture in a portion of a subterranean formation comprising: providing at least one fracture in the portion of the subterranean formation; providing partitioned, coated particulates that comprise particulates, an adhesive substance, and a partitioning agent, and wherein the partitioning agent comprises a subterranean treatment chemical; substantially slurrying the partitioned, coated particulates in a treatment fluid to create a particulate slurry; and, placing the particulate slurry into the at least one fracture in the portion of the subterranean formation so as to deposit at least a portion of the partitioned, coated particulates into the at least one fracture.

Another embodiments of the present invention provides methods of gravel packing along a portion of a well bore comprising: providing a portion of a well bore; providing partitioned, coated particulates that comprise particulates, an adhesive substance, and a partitioning agent, and wherein the partitioning agent comprises a subterranean treatment chemical; substantially slurrying the partitioned, coated particulates in a treatment fluid to create a particulate slurry; and, placing the particulate slurry into the portion of the well bore so as to deposit at least a portion of the partitioned, coated particulates into that portion and to create a gravel pack therein.

The features and advantages of the present invention will be readily apparent to those skilled in the art upon a reading of the description of preferred embodiments that follows.

DESCRIPTION OF PREFERRED EMBODIMENTS

The present invention involves methods of preparing coated particulates and using such coated particulates in subterranean applications such as production enhancement and sand control. More particularly, the present invention relates to methods of preparing particulates treated with an adhesive substance (such as a tackifying agent or curable resin) such that the particulates are able to resist sticking and clumping and need not be immediately used once they are prepared. By coating a partitioning agent onto particulates that have been treated with an adhesive substance, the methods of the present invention are capable of at least temporarily diminishing the "tackiness" of the treated particulates, thus preventing or minimizing the agglomeration of the particulates and the spreading of the adhesive substance onto equipment surfaces. In some embodiments of the present invention the coating used to at least temporarily diminishing the "tackiness" of the treated particulates may also be a treatment chemical useful in the subterranean environment. Suitable partitioning agents dissolve, degrade, or otherwise are removed from the surface of the particulate at a desired time such that the tackiness and/or curing performance of the adhesive substance is substantially restored once the partitioning agent is substantially removed. By least temporarily diminishing the tackiness of particulates coated with an adhesive substance the methods of the present invention are able to minimize the interaction of the adhesive substance with a treatment fluid or an equipment surface. As used herein, the term "tacky," in all of its forms, generally refers to a substance having a nature such that it is (or may be activated to become) somewhat sticky to the touch.

Particulates coated with adhesive substances have a tendency to agglomerate and form masses of joined particulates rather than retaining their individual character. In the methods of the present invention, particulates are treated with an adhesive substance such as a tackifying agent and/or a curable resin and then the particulates are substantially coated with a partitioning agent to help the particulates retain their individual tacky or curable character. Some embodiments of the present invention describe methods of forming coated particulates that may be created and then stored and or shipped before use without excessive agglomeration even under temperature and stress loads commonly encountered by particulates such as proppant and gravel during handling and storage before use in a subterranean formation. In some embodiments of the present invention, the coated particulates may be created a few hours or several months before they are used.

Particulates suitable for use in the present invention may be comprised of any material suitable for use in subterranean operations. Suitable particulate materials include, but are not limited to, sand; bauxite; ceramic materials; glass materials; polymer materials; TEFLON® (polytetrafluoroethylene) materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable, suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

In some embodiments of the present invention the particulate used may be a low quality particulate. The use of low-quality particulates may be particularly well suited for embodiments in which the particulates are to be coated with a tackifying agent or a curable resin. This is due, at least in part, to the fact that a coating of tackifying agent or resin may act to improve the performance of the low quality particulates. As used herein, the term "low-quality particulates" refers to particulates that do not meet at least one of the standards for sphericity, roundness, size, turbidity, acid solubility, percentage of fines, or crush resistance as recited in American Petroleum Institute Recommended Practices (API RP) standard numbers 56 and 58 for proppant and gravel respectively.

The API RP's describe the minimum standard for sphericity as at least 0.6 and for roundness as at least 0.6. As used herein, the terms "sphericity" and "roundness" are defined as described in the API RP's and can be determined using the procedures set forth in the API RP's.

API RP 56 also sets forth some commonly recognized proppant sizes as $6/12$, $8/16$, $12/20$, $20/40$, $30/50$, $40/70$, and $70/140$. Similarly, API RP 58 also sets forth some commonly recognized gravel sizes as $8/16$, $12/20$, $16/30$, $20/40$, $30/50$, and 40/60. The API RP's further note that a minimum percentage of particulates that should fall between designated sand sizes, noting that not more than 0.1 weight % of the particulates should be larger than the larger sand size and not more than a maximum percentage (1 weight % in API RP 56 and 2 weight % in API RP 58) should be smaller than the small sand size. Thus, for 20/40 proppant, no more than 0.1 weight % should be larger than 20 U.S. Mesh and no more than 1 weight % smaller than 40 U.S. Mesh.

API RP's 56 and 58 describe the minimum standard for proppant and gravel turbidity as 250 FTU or less. API RP 56 describes the minimum standard for acid solubility of proppant as no more than 2 weight % loss when tested according to API RP 56 procedures for proppant sized between $6/12$ Mesh and $30/50$ Mesh, U.S. Sieve Series and as no more than 3 weight % loss when tested according to API RP 56 procedures for proppant sized between $40/70$ Mesh and $70/140$ Mesh, U.S. Sieve Series. API RP 58 describes the minimum standard for acid solubility of gravel as no more than 1 weight % loss when tested according to API RP 58 procedures. API RP 56 describes the minimum standard for crush resistance of proppant as producing not more than the suggested maximum fines as set forth in Table 1, below, for the size being tested:

TABLE 1

Suggested Maximum Fines for Proppant Subjected to Crushing Strength

| Mesh Size (U.S. Sieve Series) | Crushing Force (lbs) | Stress on Proppant (psi) | Maximum Fines (% by weight) |
|---|---|---|---|
| 6/12 | 6,283 | 2,000 | 20 |
| 8/16 | 6,283 | 2,000 | 18 |
| 12/20 | 9,425 | 3,000 | 16 |
| 16/30 | 9,425 | 3,000 | 14 |
| 20/40 | 12,566 | 4,000 | 14 |

TABLE 1-continued

Suggested Maximum Fines for Proppant Subjected to Crushing Strength

| Mesh Size (U.S. Sieve Series) | Crushing Force (lbs) | Stress on Proppant (psi) | Maximum Fines (% by weight) |
|---|---|---|---|
| 30/50 | 12,566 | 4,000 | 10 |
| 40/70 | 15,708 | 5,000 | 8 |
| 70/140 | 15,708 | 5,000 | 6 |

Similarly, API RP 58 describes the minimum standard for crush resistance of gravel as producing not more than the suggested maximum fines as set forth in Table 1, below, for the size being tested:

TABLE 2

Suggested Maximum Fines for Gravel Subjected to Crushing Strength

| Mesh Size (U.S. Sieve Series) | Crushing Force (lbs) | Stress on Proppant (psi) | Maximum Fines (% by weight) |
|---|---|---|---|
| 8/16 | 6,283 | 2,000 | 8 |
| 12/20 | 6,283 | 2,000 | 4 |
| 16/30 | 6,283 | 2,000 | 2 |
| 20/40 | 6,283 | 2,000 | 2 |
| 30/50 | 6,283 | 2,000 | 2 |
| 40/60 | 6,283 | 2,000 | 2 |

Resins suitable for use as an adhesive substance of the present invention include all resins known in the art that are capable of forming a hardened, consolidated mass. Many such resins are commonly used in subterranean operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. By way of further example, selection of a suitable resin may be affected by the temperature of the subterranean formation to which the fluid will be introduced. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable. It is within the ability of one skilled in the art, with the benefit of this disclosure, to select a suitable resin for use in embodiments of the present invention and to determine whether a catalyst is required to trigger curing.

One resin coating material suitable for use in the proppant compositions of the present invention is a two-component epoxy based resin comprising a hardenable resin component and a hardening agent component. The hardenable resin component is comprised of a hardenable resin and an optional solvent. The second component is the liquid hardening agent component, which is comprised of a hardening agent, a silane coupling agent, a surfactant, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Where the resin coating material of the present invention is a furan-based resin, suitable furan-based resins include, but are not limited to, furfuryl alcohol, a mixture furfuryl alcohol with an aldehyde, and a mixture of furan resin and phenolic resin. Where the resin coating material of the present invention is a phenolic-based resin, suitable phenolic-based resins include, but are not limited to, terpolymers of phenol, phenolic formaldehyde resins, and a mixture of phenolic and furan resins. Of these, a mixture of phenolic and furan resins is preferred. Where the resin coating material of the present invention is a HT epoxy-based resin, suitable HT epoxy-based components included, but are not limited to, bisphenol A-epichlorohydrin resin, polyepoxide resin, novolac resin, polyester resin, glycidyl ethers and mixtures thereof.

Yet another resin suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants and one or more non-ionic surfactants, and an alkyl phosphonate surfactant.

Tackifying agents suitable for use as an adhesive substance in the present invention include non-aqueous tackifying agents, aqueous tackifying agents, and silyl-modified polyamides.

One type of tackifying agent suitable for use in the present invention is a non-aqueous tackifying agent. A particularly preferred group of non-aqueous tackifying agents comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. Such condensation reaction products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Some other suitable multifunctional materials are described in U.S. Pat. No. 5,839,510 issued to Weaver, et al., the relevant disclosure of which is herein incorporated by reference.

Solvents suitable for use with the non-aqueous tackifying agents of the present invention include any solvent that is compatible with the non-aqueous tackifying agent and achieves the desired viscosity effect. Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifyier agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifyier agent is placed in the subterranean formation. In some embodiments, a pretreatment may be first contacted with the surface of a particulate to prepare it to be coated with an aqueous tackifyier agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifyier agent may enhance the grain-to-grain contact between the individual particulates within the formation (be they proppant particulates, formation fines, or other particulates), helping bring about the consolidation of the particulates into a cohesive, flexible, and permeable mass.

Examples of aqueous tackifyier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifier agents and additional disclosure on aqueous tackifier agents can be found in U.S. patent application Ser. No. 10/864,061 and filed Jun. 9, 2004 and U.S. patent application Ser. No. 10/864,618 and filed Jun. 9, 2004 the relevant disclosures of which are hereby incorporated by reference.

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

The coated particulates of the present invention may be suspended in any treatment fluid known in the art, including aqueous gels, viscoelastic surfactant gels, oleaginous gels, foamed gels and emulsions. Suitable aqueous gels are generally comprised of water and one or more gelling agents. The emulsions may be comprised of two or more immiscible liquids such as an aqueous gelled liquid and a liquefied, normally gaseous fluid, such as nitrogen. The preferred treatment fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked treatment fluid, inter alia, reduces fluid loss and allows the fracturing fluid to transport significant quantities of suspended particulates. The treatment fluids also may include one or more of a variety of well-known additives such as breakers, stabilizers, fluid loss control additives, clay stabilizers, bactericides, and the like.

Partitioning agents suitable for use in the present invention are those substances that will dissipate once the particulates are introduced to a treatment fluid, such as a fracturing or gravel packing fluid. Partitioning agents suitable for use in the present invention should not detrimentally interfere with the adhesive substance on the particulate, and should not detrimentally interfere with the treatment fluid or the subterranean operation being performed. This does not mean that the chosen partitioning agent must be inert. Rather, in some embodiments of the present invention the partitioning agent is also a treatment chemical that has a beneficial effect on the subterranean environment, or the operation, or both. In preferred embodiments, the partitioning agent is coated onto the adhesive substance-coated particulate in an amount of from about 1% to about 20% by weight of the coated particulate. In preferred embodiments, the substantially the entire surface of the adhesive substance coating is coated with partitioning agent.

Partitioning agents suitable for use in the present invention are those materials that are capable of coating onto the adhesive substance pre-coating on the particulate and reducing its tacky character. Suitable partitioning agents may be substances that will quickly dissipate in the presence of the treatment fluid. Examples of suitable partitioning agents that will dissolve quickly in an aqueous treatment fluid include solid salts (such as rock salt, fine salt, KCl, and other solid salts known in the art), barium sulfate, lime, benzoic acid, polyvinyl alcohol, sodium carbonate, sodium bicarbonate, molybdenum disulfide, sodium hydroxide graphite, zinc, lime, quebracho, lignin, lignite, causticized lignite, lignosulfonate, chrome lignosulfonate, napthalenesulfonate, uintahite (gilsonite), polyvinvyl alcohol, and mixtures thereof. One skilled in the art will recognize that where lime (calcium carbonate) is chosen for use as a partitioning agent in the present invention it may be used in any of its forms, including quicklime, hydrated lime, and hydraulic lime. The partitioning agent also may be a substance that dissipates more slowly in the presence of the treatment fluid. Partitioning agents that dissolve more slowly may allow the operator more time to place the coated particulates. Examples of suitable partitioning agents that will dissolve more slowly in an aqueous treatment fluid include calcium oxide, degradable polymers, such as polysaccharides; chitins; chitosans; proteins; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and poly(phosphazenes); and mixtures thereof.

Where the treatment fluid is an oleaginous treatment fluid, examples of suitable partitioning agents that will dissolve in an oleaginous treatment fluid include wax, gilsonite, sulfonated asphalt, naphthalenesulfonate, oil soluble resins, and combinations thereof. Some suitable oil soluble resins include, but are not limited to, styrene-isoprene copolymers, hydrogenated styrene-isoprene block copolymers, styrene ethylene/propylene block copolymers, styrene isobutylene copolymers, styrene-butadiene copolymers, polybutylene, polystyrene, polyethylene-propylene copolymers, and combinations thereof.

The chosen partitioning agent should be able to at least temporarily reduce the tacky nature of the adhesive substance coated onto the particulate, but it may also perform other functions. For example, some embodiments of the present invention coat a particulate with a resin and then use a partitioning agent that is a resin hardening agent. In other embodiments the partitioning agent may act as a scale inhibitor, corrosion inhibitor, parrafin remover, gel breaker, crosslink de-linker, gas hydrate inhibitor, or any other solid treatment chemical that can be coated on top of an adhesive substance to at least temporarily reduce its tacky nature.

Moreover, in some embodiments the adhesive substance and partitioning agent may be coated onto a particulate in layers. By way of example, a particulate may be coated with an adhesive substance and then coated with a partitioning agent and then coated again with an adhesive substance and then coated again with a partitioning agent. In such a case the first and second coatings of the adhesive substance need not be the same and the first and second coatings of the partitioning agent need not be the same. As will be understood by one skilled in the art, more than two layers of adhesive substances and partitioning agents may be used. This may be particularly useful in situations wherein it is desirable to delay the release of a partitioning agent that also acts as a treatment chemical. For example, a first (inner) layer of partitioning agent may be a treatment chemical that is a gel breaker and a second layer of partitioning agent may be an inert, slowly dissolving partitioning agent. Also for example, the first (inner) layer of partitioning agent may be a crosslinker, with a second layer of partitioning agent being a slowly dissolving partitioning agent. Also for example, the first (inner) layer of partitioning agent may be a hardenable resin component, with a second layer being an inert dissolving agent, and a third layer being a hardening agent component.

Some embodiments of the methods of the present invention provide methods for treating subterranean formations using partitioned, coated particulates wherein the coated particulates are made by substantially coating particulates with an adhesive substance to create adhesive-coated particulates and then substantially covering the adhesive-coated particulates with a partitioning agent to create partitioned, coated particulates.

Suitable partitioned, coated particulates may be used in a variety of subterranean treatments including fracturing, gravel packing, and frac-packing treatments wherein the partitioned, coated particulates are generally substantially slurried into a treatment fluid to create a partitioned, coated particulate slurry that may then be placed into a desired location within a portion of a subterranean formation.

To facilitate a better understanding of the present invention, the following examples of some of the preferred embodiments are given. In no way should such examples be read to limit the scope of the invention.

EXAMPLES

Example 1

A sample of bauxite particulates was pre-coated with a high temperature epoxy resin and another sample was pre-coated with a furan resin; each sample contained 7.8 cc of resin per 250 grams of particulate. Sodium bicarbonate powder (20 grams) was then covered onto each of the resin coated samples to form coated particulates. The samples of particulates were stored at room temperature for three days. After that time the samples, still substantially non-agglomerated, were mixed in an aqueous-based fracturing fluid and formed a slurry concentration of 7 pounds of particulates per gallon of fracturing fluid. The sodium bicarbonate covering dissolved as the particulates were mixed into the fracturing fluid. The coated particulates of the present invention proved capable of retaining their individual character even after being stored for a period of time.

The slurry was then crosslinked, stirred for an hour at 180° F., and then packed into a brass chamber and cured for at least 8 hours at 325° F. Core samples obtained from the cured particulates reflected consolidation strength of between 850 and 1,100 psi. Thus, the covering used to create the coated particulates did not act to impair consolidation.

Example 2

High-molecular weight polyamide tackifying compound in the amount of 3 cc was dry coated directly onto 300 grams of 20/40-mesh Brady sand by hand stirring with a spatula to form a thin film of the compound on the sand grains. Afterward, 20 grams of KCl powder with average particle size distribution of 40 microns was hand stirred into the coated sand until the coated sand became dry. A sample of this dry coated sand was then mixed with water. The tackiness immediately returned to the coated sand.

Example 3

Low-molecular weight polyamide tackifying compound in the amount of 3 cc was dry coated directly onto 300 grams of 20/40-mesh Brady sand by hand stirring with a spatula to form a thin film of the compound on the sand grains. Afterward, 20 grams of KCl powder with average particle size distribution of 40 microns was hand stirred into the coated sand until the coated sand became dry. A sample of this dry coated sand was then mixed with water. The coated sand immediately became tacky again.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a portion of a subterranean formation comprising:
   providing partitioned, coated particulates that comprise particulates, an adhesive substance, and a partitioning agent at least partially coated onto the adhesive substance, wherein the partitioning agent comprises a subterranean treatment chemical;
   substantially slurrying the partitioned, coated particulates in a treatment fluid to create a particulate slurry; and,
   placing the particulate slurry into the portion of the subterranean formation.

2. The method of claim 1 wherein the method by which the partitioned, coated particulates are made comprises: substantially coating the particulates with an adhesive substance to create adhesive-coated particulates and then substantially covering the adhesive-coated particulates with a partitioning agent to create partitioned, coated particulates.

3. The method of claim 2 wherein the partitioned, coated particulates comprise more than one alternating layers of adhesive substance and partitioning agent.

4. The method of claim 1 wherein the particulates comprise particulates selected from the group consisting of: low quality particulates; sand; bauxite; ceramic materials; glass materials; polymer materials; polytetrafluoroethylene materials; nut shell pieces; seed shell pieces; cured resinous particulates comprising nut shell pieces; cured resinous particulates comprising seed shell pieces; fruit pit pieces; cured resinous particulates comprising fruit pit pieces; wood; and composite particulates.

5. The method of claim 1 wherein the adhesive substance comprises at least one resin selected from the group consisting of two-component epoxy-based resins, furan-based resins, phenolic-based resins, high-temperature (HT) epoxy-based resins, phenol/phenol formaldehyde/furfuryl alcohol resins, and combinations thereof.

6. The method of claim 1 wherein the adhesive substance comprises at least one substance selected from the group consisting of aqueous tackifying agents, non-aqueous tackifying agents, and silyl-modified polyamides.

7. The method of claim 6 wherein the aqueous tackifying agent comprises at least one material selected from the group consisting of: acrylic acid polymers, acrylic acid ester polymers, acrylic acid derivative polymers, acrylic acid homopolymers, acrylic acid ester homopolymers, acrylic acid ester copolymers, methacrylic acid derivative polymers, methacrylic acid homopolymers, methacrylic acid ester homopolymers, acrylamido-methyl-propane sulfonate polymers, acrylamido-methyl-propane sulfonate derivative polymers, acrylamido-methyl-propane sulfonate copolymers, and acrylic acid/acrylamido-methyl-propane sulfonate copolymers.

8. The method of claim 6 wherein the non-aqueous tackifying agent comprises at least one material selected from the group consisting of polyamides, polyesters, polycarbonates, polycarbamates, and natural resins.

9. The method of claim 6 wherein the aqueous tackifying agent comprises at least one material selected from the group consisting of poly(methyl acrylates), poly(butyl acrylates), poly(2-ethylhexyl acrylates), poly(methyl methacrylates), poly(butyl methacrylates), and poly(2-ethylhexyl methacryates).

10. The method of claim 6 wherein the silyl-modified polyamide comprises a reaction product of a silating compound with one or more polyamides.

11. The method of claim 1 wherein the subterranean treatment chemical comprises at least one chemical selected from the group consisting of scale inhibitors, breakers, corrosion inhibitors, paraffin removers, gel breakers, crosslink de-linkers, and gas hydrate inhibitors.

12. The method of claim 1 wherein the treatment fluid comprises at least one fluid selected from the group consisting of aqueous gels, viscoelastic surfactant gels, oleaginous gels, foamed gels, and emulsions.

13. A method of creating a propped fracture in a portion of a subterranean formation comprising:
   providing at least one fracture in the portion of the subterranean formation;
   providing partitioned, coated particulates that comprise particulates, an adhesive substance, and a partitioning agent at least partially coated onto the adhesive substance, wherein the partitioning agent comprises a subterranean treatment chemical;
   substantially slurrying the partitioned, coated particulates in a treatment fluid to create a particulate slurry; and,
   placing the particulate slurry into the at least one fracture in the portion of the subterranean formation so as to deposit at least a portion of the partitioned, coated particulates into the at least one fracture.

14. The method of claim 13 wherein the method by which the partitioned, coated particulates are made comprises: substantially coating the particulates with an adhesive substance to create adhesive-coated particulates and then sub stantially covering the adhesive-coated particulates with a partitioning agent to create partitioned, coated particulates.

15. The method of claim 14 wherein the partitioned, coated particulates comprise more than one alternating layers of adhesive substance and partitioning agent.

16. The method of claim 13 wherein the treatment chemical comprises at least one chemical selected from the group consisting of scale inhibitors, breakers, corrosion inhibitors, paraffin removers, gel breakers, crosslink de-linkers, and gas hydrate inhibitors.

17. The method of claim 13 wherein the partitioning agent comprises at least one material selected from the group consisting of: calcium oxide, degradable polymers, poly(glycolides), poly($\epsilon$-caprolactones), poly(hydroxybutyrates), poly(anhydrides), aliphatic polycarbonates, poly(orthoesters), poly(amino acids), poly(ethylene oxides), poly(phosphazenes), solid salts, barium sulfate, lime, benzoic acid, polyvinyl alcohol, sodium carbonate, sodium bicarbonate, molybdenum disulfide, sodium hydroxide graphite, zinc, quebracho, lignin, lignite, causticized lignite, lignosulfonate, chrome lignosulfonate, napthalenesulfonate, uintahite, wax, gilsonite, sulfonated asphalt, oil-soluble resins, styrene-isoprene copolymer, hydrogenated styrene-isoprene block copolymers, styrene ethylene/propylene block copolymers, styrene isobutylene copolymers, styrene-butadiene copolymers, polybutylene, polystyrene, and polyethylene-propylene copolymers.

18. A method of gravel packing along a portion of a well bore comprising:
providing a portion of a well bore;
providing partitioned, coated particulates that comprise particulates, an adhesive substance, and a partitioning agent, and wherein the partitioning agent comprises a subterranean treatment chemical at least partially coated onto the adhesive substance;
substantially slurrying the partitioned, coated particulates in a treatment fluid to create a particulate slurry; and,
placing the particulate slurry into the portion of the well bore so as to deposit at least a portion of the partitioned, coated particulates into that portion and to create a gravel pack therein.

19. The method of claim 18 wherein the method by which the partitioned, coated particulates are made comprises: substantially coating the particulates with an adhesive substance to create adhesive-coated particulates and then substantially covering the adhesive-coated particulates with a partitioning agent to create partitioned, coated particulates.

20. The method of claim 19 wherein the partitioned, coated particulates comprise more than one alternating layers of adhesive substance and partitioning agent.

21. The method of claim 18 wherein the treatment chemical comprises at least one chemical selected from the group consisting of scale inhibitors, breakers, corrosion inhibitors, paraffin removers, gel breakers, crosslink de-linkers, and gas hydrate inhibitors.

22. The method of claim 18 wherein the partitioning agent comprises at least one material selected from the group consisting of: calcium oxide, degradable polymers, poly(glycolides), poly($\epsilon$-caprolactones), poly(hydroxybutyrates), poly(anhydrides), aliphatic polycarbonates, poly(orthoesters), poly(amino acids), poly(ethylene oxides), poly(phosphazenes), solid salts, barium sulfate, lime, benzoic acid, polyvinyl alcohol, sodium carbonate, sodium bicarbonate, molybdenum disulfide, sodium hydroxide graphite, zinc, quebracho, lignin, lignite, causticized lignite, lignosulfonate, chrome lignosulfonate, napthalenesulfonate, uintahite, wax, gilsonite, sulfonated asphalt, oil-soluble resins, styrene-isoprene copolymer, hydrogenated styrene-isoprene block copolymers, styrene ethylene/propylene block copolymers, styrene isobutylene copolymers, styrene-butadiene copolymers, polybutylene, polystyrene, and polyethylene-propylene copolymers.

* * * * *